United States Patent
Nyström (10) Patent No.: US 9,548,669 B2
(45) Date of Patent: Jan. 17, 2017

(54) SYNCHRONOUS START-UP OF PARALLEL POWER CONVERTERS IN A SWITCHED-MODE POWER SUPPLY

(71) Applicant: TELEFONAKTIEBOLAGET L M ERICSSON (PUBL), Stockholm (SE)

(72) Inventor: Michael Nyström, Åkersberga (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 70 days.

(21) Appl. No.: 14/713,518

(22) Filed: May 15, 2015

(65) Prior Publication Data

US 2016/0336867 A1 Nov. 17, 2016

(51) Int. Cl.
 *H02M 1/36* (2007.01)
 *H02M 3/335* (2006.01)

(52) U.S. Cl.
 CPC .......... *H02M 3/33592* (2013.01); *H02M 1/36* (2013.01)

(58) Field of Classification Search
 CPC ...... H02M 1/08; H02M 1/36; H02M 3/33507; H02M 3/33592
 USPC ........................................ 363/16, 49, 65, 97
 See application file for complete search history.

(56) References Cited

U.S. PATENT DOCUMENTS

| | | | | |
|---|---|---|---|---|
| 5,783,799 A * | 7/1998 | Geissler | ............... | B23K 9/1043 219/130.21 |
| 7,050,309 B2 * | 5/2006 | Farrington | ........ | H02M 3/33592 363/17 |
| 7,872,886 B2 * | 1/2011 | Xu | ...................... | H02M 3/1584 307/77 |
| 2003/0142513 A1 * | 7/2003 | Vinciarelli | .............. | H02J 1/102 363/17 |
| 2005/0254272 A1 * | 11/2005 | Vinciarelli | ............ | H02M 3/157 363/65 |
| 2016/0116925 A1 * | 4/2016 | Freeman | ........... | H02M 3/33546 307/130 |

\* cited by examiner

*Primary Examiner* — Jeffrey Sterrett
(74) *Attorney, Agent, or Firm* — Roger S. Burleigh (57) ABSTRACT

Methods and apparatuses for controlling synchronous start-up of power converters arranged in parallel in droop load share switched-mode power supplies are described. In one embodiment, a method may be performed by circuitry in a DC-DC power converter. The DC-DC power converter includes an inverting switch that converts input DC power to intermediate AC power, a transformer coupled to the inverting switch to receive the intermediate AC power and provide stepped-down AC power, and a synchronous rectifier coupled to the transformer to convert the stepped-down AC power to output DC power. The method comprises detecting that the inverting switch is not switching during start-up of the DC-DC power converter, and increasing a reference voltage set point of the DC-DC power converter in response to detecting that the inverting switch is not switching to force the inverting switch to start switching.

15 Claims, 4 Drawing Sheets

SYNCHRONOUS START-UP OF PARALLEL POWER CONVERTERS IN A SWITCHED-MODE POWER SUPPLY

TECHNICAL FIELD

The present invention generally relates to droop load share switched-mode power supplies and start-up methods for such power supplies, and particularly relates to control of power converters arranged in parallel in such power supplies.

BACKGROUND

Switched-mode power supplies (SMPSs) are used in a variety applications to supply power and power conversion, (e.g., AC to DC conversion or DC to DC conversion) and have various advantages over other types of power supplies. For example, SMPSs are generally smaller, lighter, more efficient, and have more flexibility than linear regulated power supplies, all else being equal. In certain applications a high output current is needed and a plurality of SMPSs, or more accurately a plurality of the DC-DC power converter portions of a plurality of SMPSs, are arranged in parallel to share the high current load. Such an arrangement is referred to as a paralleled droop load share SMPS unit, or simply a droop load share SMPS.

The power converter of a typical SMPS includes an inverting switch that receives high DC input power and converts the high DC input power to intermediate AC power, a transformer that steps the high AC power down to a low (i.e., stepped-down) AC power, and a synchronous rectifier that converts the stepped-down AC power to low DC output power. The high DC input power may be produced by any DC voltage source, e.g., a rectifier that receives AC power from a mains electricity power supply or a DC voltage battery.

When starting up the power converter of an SMPS, switching of the synchronous rectifier is often started as early as possible. However, in some applications a start-up sequence of cycle includes two phases or modes—a ramp-up mode (i.e., diode mode) in which the synchronous rectifier's switches are off, followed by a ramp-in mode in which the synchronous rectifier is active and switching. The ramp-in mode is entered after the output voltage of the power converter has reached a nominal threshold value.

Typically the paralleled power converters in a droop load share SMPS are started up in the same way as when the power converters are not intended to be connected in parallel, i.e., as described above. However, not all power converters have the same start-up time. A power converter that starts slowly can experience current flowing into its output terminal, i.e., reverse currents, when arranged in parallel with an SMPS that starts more quickly. The reverse currents can result in body diode conduction in MOSFETs used in the inverting switch, avalanche breakdown in MOS-FETs used in the synchronous rectifier, as well as overuse of snubbers. Eventually such stress on the components can result in failure of the power converter or, alternatively, a higher cost for the power converter due to the use of more expensive components with better performance that can withstand such stresses. Moreover, during the ramp-up mode of the start-up cycle (i.e., when the synchronous rectifier is in diode mode), the difference in start-up times between power converters can result in that only one of the paralleled power converters starts up and the others do not start until the load on the output has increased. In effect, a high output voltage of a quick-starting power converter causes the control circuitry of the slow-starting power converter to misread the slow-starting power converter's output voltage as being higher than it actually is and therefore the control circuitry may prematurely pause the slow-starting power converter's start-up cycle. This situation can result in interruptions or dips in the output voltage of the paralleled power converters when the load changes fast. Also it can result in high reverse currents for longer amounts of time during the ramp-in mode of the synchronous rectification with the attendant stress on the power converter components.

SUMMARY

This disclosure presents methods, systems, and apparatuses for facilitating synchronous start-up of parallel power converters in a droop load share SMPS. Synchronous start-up is at least partially facilitated by increasing a reference voltage set point of a paralleled power converter during a ramp-up mode of the start-up cycle to force the power converter to continue the start-up cycle when a high output voltage of another of the paralleled power converters would otherwise cause the power converter's control circuitry to pause the start-up cycle. Moreover, the reference voltage set point of the power converter can be increased during a ramp-in mode of the start-up cycle to limit or eliminate an amount of time in which the power converter experiences reverse current.

In an aspect of the invention a method for controlling a DC-DC power converter is proposed. The DC-DC power converter includes an inverting switch that converts input DC power to intermediate AC power, a transformer coupled to the inverting switch to receive the intermediate AC power and provide stepped-down AC power, and a synchronous rectifier coupled to the transformer to convert the stepped-down AC power to output DC power, the DC-DC power converter being arranged in parallel with at least one other DC-DC power converter in a droop load share switched-mode power supply. The method comprises detecting that the inverting switch is not switching during start-up of the DC-DC power converter; and increasing a reference voltage set point of the DC-DC power converter in response to detecting that the inverting switch is not switching to force the inverting switch to start switching.

In a still further aspect of the method, detecting that the inverting switch is not switching during start-up of the DC-DC power converter includes detecting that the inverting switch is not switching during at least one of a diode mode and a ramp-in mode of the synchronous rectifier.

In a still further aspect of the method, the inverting switch provides the intermediate AC power to a primary side of the transformer and detecting that the inverting switch is not switching includes measuring an output of the secondary side of the transformer.

In a still further aspect of the method, the method further comprises detecting that a voltage level at an output of the synchronous rectifier is higher than a threshold, and increasing the reference voltage set point of the power converter in response to detecting that the voltage level at the output of the synchronous rectifier is higher than the threshold to force the DC-DC power converter to increase the stepped-down AC power provided by the transformer.

In a still further aspect of the method, the reference voltage set point of the power converter is increased no higher than a highest voltage level expected to be output by any of the other power converters.

In another aspect of the invention a droop load share switched-mode power supply is proposed. The droop load share switched-mode power supply comprises a first DC-DC power converter and a second DC-DC power converter arranged in parallel with the first DC-DC power converter. The first DC-DC power converter includes an inverting switch configured to convert input DC power to intermediate AC power, a transformer coupled to the inverting switch to receive the intermediate AC power and provide stepped-down AC power, a synchronous rectifier coupled to the transformer to convert the stepped-down AC power to output DC power, and control circuitry configured to control the power converter. The control circuitry of the first DC-DC power converter includes circuitry configured to detect that the inverting switch is not switching during start-up of the first DC-DC power converter; and increase a reference voltage set point of the first DC-DC power converter in response to detecting that the inverting switch is not switching to force the inverting switch to start switching.

In a further aspect of the droop load share switched-mode power supply, the circuitry configured to detect that the inverting switch is not switching during start-up of the DC-DC power converter is configured to detect that the inverting switch is not switching during a diode mode and a ramp-in mode of the synchronous rectifier.

In a still further aspect of the droop load share switched-mode power supply, the inverting switch is configured to provide the intermediate AC power to a primary side of the transformer and the circuitry configured to detect that the inverting switch is not switching includes circuitry configured to measure an output of the secondary side of the transformer.

In a still further aspect of the droop load share switched-mode power supply, the control circuitry of the first DC-DC power converter further includes circuitry configured to detect that a voltage level at an output of the synchronous rectifier is higher than a threshold, and increase the reference voltage set point of the power converter in response to detecting that the voltage level at the output of the synchronous rectifier is higher than the threshold to force the DC-DC power converter to increase the stepped-down AC power provided by the transformer.

In a still further aspect of the droop load share switched-mode power supply, the reference voltage set point of the power converter is increased no higher than a highest voltage level expected to be output by any of the other power converters.

In another aspect of the invention a DC-DC power converter configured for operation in parallel with at least one other DC-DC power converter in a droop load share switched-mode power supply is proposed. The DC-DC power converter comprises an inverting switch configured to convert input DC power to intermediate AC power, a transformer coupled to the inverting switch to receive the intermediate AC power and provide stepped-down AC power, a synchronous rectifier coupled to the transformer to convert the stepped-down AC power to output DC power, and control circuitry configured to control the power converter. The control circuitry includes circuitry configured to detect that the inverting switch is not switching during start-up of the DC-DC power converter, and increase a reference voltage set point of the DC-DC power converter in response to detecting that the inverting switch is not switching to force the inverting switch to start switching.

In a further aspect of the DC-DC power converter, the circuitry configured to detect that the inverting switch is not switching during start-up of the DC-DC power converter is configured to detect that the inverting switch is not switching during a diode mode and a ramp-in mode of the synchronous rectifier.

In a still further aspect of the DC-DC power converter, the inverting switch is configured to provide the intermediate AC power to a primary side of the transformer and the circuitry configured to detect that the inverting switch is not switching includes circuitry configured to measure an output of the secondary side of the transformer.

In a still further aspect of the DC-DC power converter, the control circuitry of the first DC-DC power converter further includes circuitry configured to detect that a voltage level at an output of the synchronous rectifier is higher than a threshold, and increase the reference voltage set point of the power converter in response to detecting that the voltage level at the output of the synchronous rectifier is higher than the threshold to force the DC-DC power converter to increase the stepped-down AC power provided by the transformer.

In a still further aspect of the DC-DC power converter, the reference voltage set point of the power converter is increased no higher than a highest voltage level expected to be output by any of the other power converters.

These and other embodiments according to the present invention are now illustrated in more detail with reference to the enclosed drawings.

DETAILED DESCRIPTION

Figure 1:
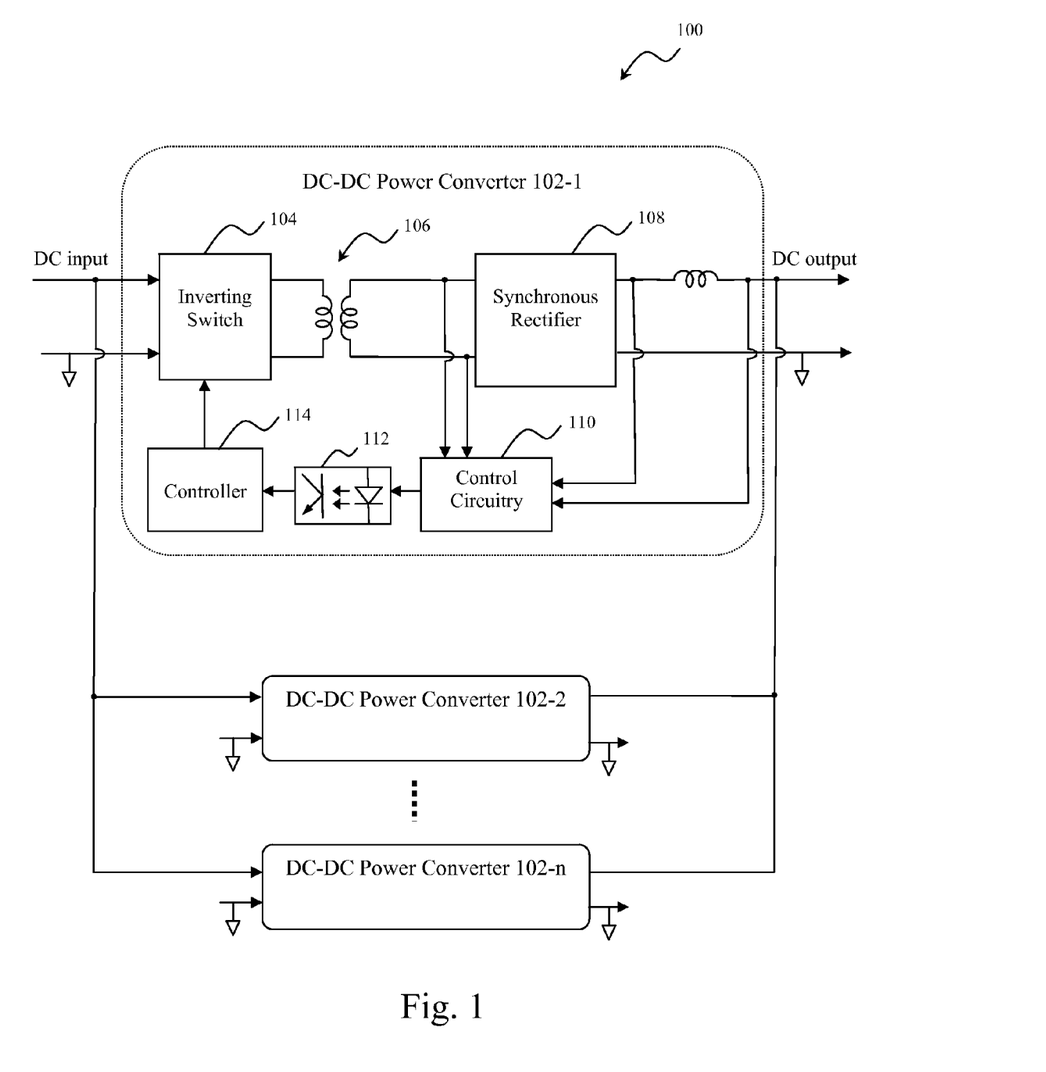
FIG. 1 is a block diagram of a droop load share SMPS with a plurality of DC-DC power converters arranged in parallel with control circuitry for synchronous start-up.

FIG. 1 depicts a block diagram of a droop load share SMPS 100 that includes a plurality of DC-DC power converters 102-1, 102-2, . . . 102-n (also referred to as "converters") arranged in parallel. The droop load share SMPS 100 receives a high DC input power (e.g., 48 volts) and outputs a low DC output power (e.g., 11 volts). The high DC input power may be produced by any DC voltage source, e.g., a rectifier that receives AC power from a mains electricity power supply or a DC voltage battery. During operation, each of the paralleled converters receives and converts the high DC input power to low DC output power, each converter contributing a similar amount of current to a load (not depicted) that receives the low DC output power.

FIG. 1 shows a detailed view of the converter 102-1, which is representative of the other converters 102-1 . . . 102-n. Thus, the description herein of the structure and operation of the converter 102-1 is also applicable to the other converters 102-2 . . . 102-n. As depicted, the converter 102-1 includes an inverting switch 104 that converts input DC power to intermediate AC power, a transformer 106 that steps the high AC power down to a low or stepped-down AC power, and a synchronous rectifier 108 that converts the stepped-down AC power to low DC output power.

The converter 102-1 also includes control circuitry 110 that measures a voltage level of the low DC output power and compares the voltage level of the output power with a reference voltage set point to produce an error signal that is communicated via an optoelectronic interface 112 (used to isolate the primary and secondary sides of the transformer) to a controller 114. The controller 114 then produces one or more control signals to control the inverting switch 104 to increase or decrease the intermediate AC power level. For example, the inverting switch 104 includes one or more switches (not shown) that switch on and off at a controlled rate to produce the intermediate AC power at a desired power level. The controller 114 can control the switching of such switches to produce the desired intermediate AC power using, e.g., a variable duty cycle of a pulse width modulator (not shown). Moreover, the controller 114 may control switch timing of switches in the synchronous rectifier 108 (see switches 201 in FIG. 2) to efficiently produce the output DC power. The controller 114 may also control other components of the converter 102-1. For example, the controller 114 may control timing of when the synchronous rectifier 108 transitions to different modes of operation (explained in more detail further below). However, for clarity only control signals relevant to explaining embodiments of the invention are shown in FIG. 1.

Figure 2:
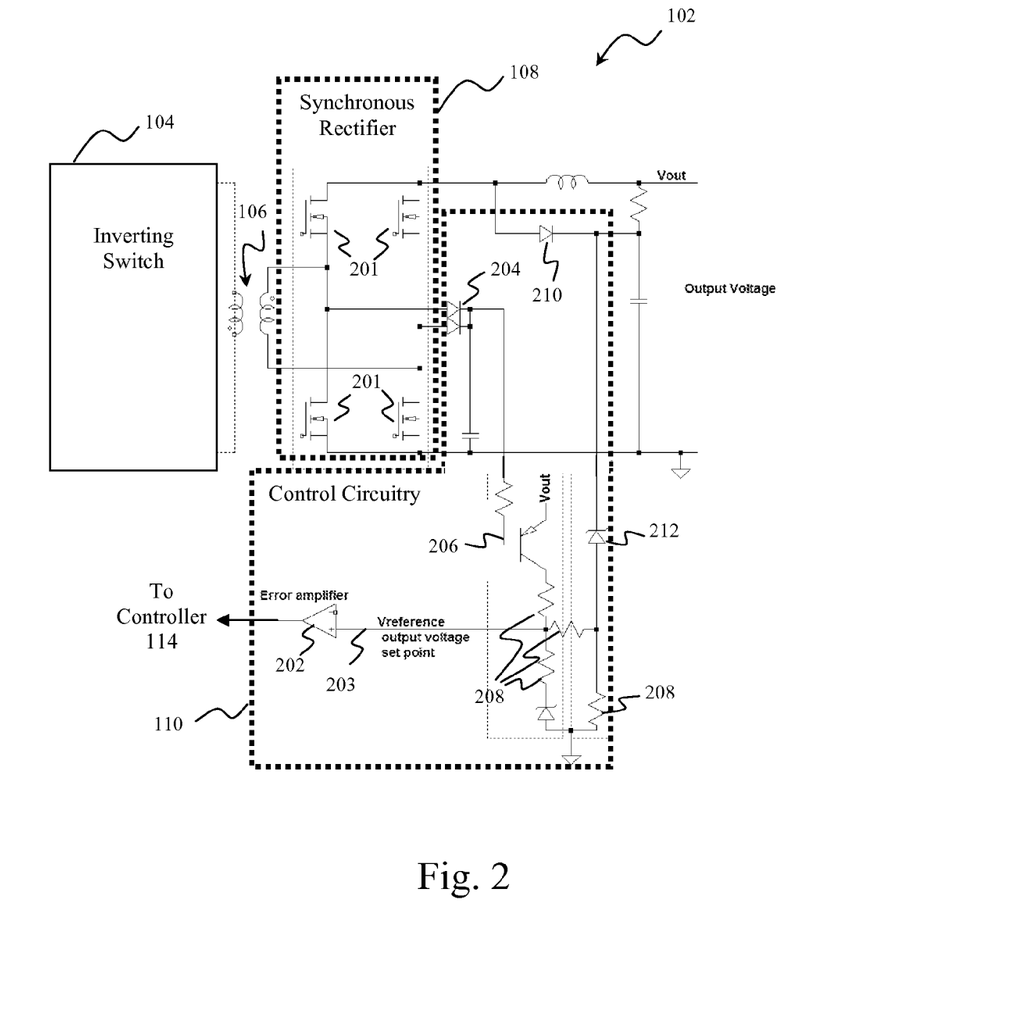
FIG. 2 is a block diagram showing a detailed view of a synchronous rectifier and control circuitry of a DC-DC power converter in the droop load share SMPS of FIG. 1.

FIG. 2 depicts a block diagram showing a detailed view of the synchronous rectifier 108 and the control circuitry 110 of a representative one of the converters 102 of FIG. 1. The synchronous rectifier 108 includes two pairs of switches 201 (e.g., MOSFET switches) coupled in series, each pair coupled to opposite ends of a secondary winding of the transformer 106. The switches 201 of the synchronous rectifier 108 are controlled to operate in three modes: a diode mode, a ramp-in mode, and a normal operation mode. In the diode mode, the switches 201 are turned off. This mode is entered when the converter 102 is first started up during ramp-up of the output voltage of the converter 102. Then, in the ramp-in mode the switches 201 are activated to switch on and off with a low duty cycle. The duty cycle is gradually increased during the ramp-in mode until the normal mode of operation is reached when the output voltage of the converter has reached a target voltage level (e.g., 11 volts) as measured by an error amplifier 202 that compares a reference voltage set point 203 to the output voltage of the converter 102. During the normal mode of synchronous rectifier operation, the on time of the switches 201 is controlled to match an off time of corresponding switches (not shown) in the inverting switch 104 on the primary side of the transformer 106.

However, as noted in the background section above, the converters 102 may not start in perfect synchronization with each other. For example, due to minor variations in the components of each converter, the output of one converter, e.g. the converter 102-2, could reach the target voltage level before another converter, e.g., the converter 102-1. Moreover, because the converters are arranged in parallel, the outputs of each converter are coupled together. Accordingly, the output of the quick-starting converter can influence voltage level output measurements made by the control circuitry 110 of the slow starting converters, thereby causing the control circuitry 110 to report an error signal to the controller 114 that is lower than if the converters were not coupled in parallel. The controller 114, having received a low error signal from the control circuitry 110 indicating that the output voltage level of the converter 102 is at or near the target voltage level, will then cause the inverting switch 104 to reduce its output power level, e.g., by reducing a duty cycle of a pulse width modulator controlling the duty cycle of switches in the inverting switch 104. However, this will have little effect on the output voltage level measured by the control circuitry 110 because of the influence of one or more other converters 102 on the output voltage level of the converter 102. Therefore, the duty cycle of the switches in the inverting switch 104 may eventually be lowered to the point that the inverting switch 104 stops switching, resulting in interruptions or dips in the output voltage of the droop load share switched-mode power supply 100, particularly when a load on the droop load share switched-mode power supply 100 is introduced or increased. Another adverse effect of such non-synchronous start-up is reverse currents during the ramp-in mode of the synchronous rectifier 108 in a slow-starting converter. Such reverse currents can stress the components of the synchronous rectifier 108, resulting in either a higher cost or a shortened lifespan of the droop load share switched-mode power supply 100.

Therefore, to facilitate synchronous start-up, the control circuitry 110 includes circuitry configured to detect that the inverting switch 104 is not switching during start-up of the converter 102 (i.e., a duty cycle of the inverting switch 104 is zero) and increase the reference voltage set point 203 of the converter 102 in response to detecting that the inverting switch 104 is not switching. The increase of the reference voltage set point 203 will force the inverting switch 104 to start switching again to thereby continue the start-up cycle. In one embodiment, the reference voltage set point 203 of the converter 102-1 is increased no higher than a highest voltage level designed or expected to be output by any of the other converters 102 (e.g., the reference voltage set point 203 is increased by an amount ranging from about 0.5 volts to about 1 volt). The stopped switching condition of the inverting switch 104 is most likely to be detected during either the diode mode or the ramp-in mode of the synchronous rectifier 108. During the normal operation mode, the stopped switching condition is unlikely to occur.

In one embodiment of the control circuitry 110, detection that the inverting switch is not switching is implemented by measuring an output of the secondary side of the transformer 106. If the secondary side of the transformer 106 is not outputting a stepped down AC power signal this indicates that the inverting switch 104 has stopped switching. Moreover, the stopped switching condition of the inverting switch 104 is likely due to a command from the controller 114, which has incorrectly determined that the target voltage level of the converter has been exceeded.

Increasing the reference voltage set point 203 in response to detecting the stopped switching condition may be accomplished in a variety of ways. In the embodiment shown in FIG. 2 the control circuitry 110 includes a pair of diodes 204, each coupled at the anode end to a different terminal of the secondary side of the transformer 106. The cathode ends of the diodes 204 are coupled together and to a switch 206. The diodes 204 may already be included in the converter 102-1 for other purposes or may be added to facilitate detection of the stopped switching condition. In the embodiment shown, the switch 206 is implemented as a PNP transistor switch and the diodes 204 are coupled to the base of the switch 206. The emitter of the switch 206 is coupled to the output voltage of the converter 102 and the collector of the switch 206 is coupled to a resistor network 208. The resistor network 208 is coupled to the reference voltage set point 203. When an output voltage of the diodes 204 goes below a threshold level this indicates that the inverting switch 104 has stopped switching and the switch 206 is enabled causing current to flow through the resistor network 208. The flow of current through the resistor network 208 causes the voltage reference set point 203 to increase from its nominal value (set by other control circuitry that is not shown). The amount of increase is set by the values of the resistors 208 of the resistor network and the amount of current flowing through the resistors 208 when the switch 206 is enabled.

Under certain conditions, particularly during the ramp-in mode of the synchronous rectifier 108, the inverting switch 104 can stop switching while the output of the secondary side of the transformer continues to pulse, albeit with a very low duty cycle. Therefore, the stopped switching condition of the inverting switch 104 may not be detected under such conditions. Therefore, to further facilitate synchronous start-up, the control circuitry 110 includes circuitry configured to detect that a voltage level at an output of the synchronous rectifier 108 is higher than a threshold during the ramp-in mode. The control circuitry 110 further include circuitry configured to increase the reference voltage set point of the power converter in response to detecting that the voltage level at the output of the synchronous rectifier is higher than the threshold. A high voltage level at the output of the synchronous rectifier 108 indicates that the transformer 106 is not supplying sufficient power to the synchronous rectifier 108, which in turn indicates that the inverting switch 104 has likely stopped switching. Moreover, the high voltage indicates the presence of reverse currents, which can wear out and potentially damage the switches of the synchronous rectifier 108 and/or snubbers (not shown) of the converter 102.

By increasing the reference voltage set point 203 in response to detecting the high voltage level at the output of the synchronous rectifier 108, the inverting switch 104 will be forced to start switching again, which will force the converter 102 to increase the stepped-down AC power provided by the transformer 106 and thereby continue the start-up cycle. In one embodiment, the reference voltage set point of the converter 102 is increased no higher than a highest voltage level designed or expected to be output by any of the other converters 102.

Increasing the reference voltage set point 203 in response to detecting the high voltage level may be accomplished in a variety of ways. In the embodiment shown in FIG. 2, the control circuitry 110 includes a diode 210 with its anode end coupled to the MOSFET switches 201 of the synchronous rectifier 108 to measure the output of the synchronous rectifier 108. The cathode end of the diode 210 is coupled to the cathode end of a zener diode 212 and the anode end of the zener diode 212 is coupled to at least some of the resistors in the resistor network 208. When the output voltage of the synchronous rectifier 108 goes above a threshold level corresponding to a breakdown voltage of the zener diode 212 (e.g., 18 volts), this indicates that the inverting switch 104 has stopped switching and the zener diode 212 passes current from the output of the synchronous rectifier 108 to the resistor network 208. The flow of current through the resistor network 208 causes the voltage reference set point 203 to increase from its nominal value. The amount of increase is set by the values of the resistors 208 of the resistor network and the amount of current flowing through the resistors 208 when the voltage at the cathode of the zener diode 212 reaches the breakdown level.

It is to be understood that the structures illustrated in FIGS. 1 and 2 are merely schematic and that the droop load share SMPS 100 and/or its power converters 102 may actually include further components which, for the sake of clarity, have not been illustrated, e.g., further interfaces or additional circuitry and/or controllers. For example, the transformer 106 may be modified to include a center-tapped secondary winding. Moreover, the control circuitry 110 may be appropriately modified to accommodate such a configuration to detect the stopped switching condition of the inverting switch 104. In another example configuration, the output stage of one or more of the converters 102 may be configured with two output inductors in a current doubling arrangement, which does not require any substantial modification to the control circuitry 110.

Figure 3:
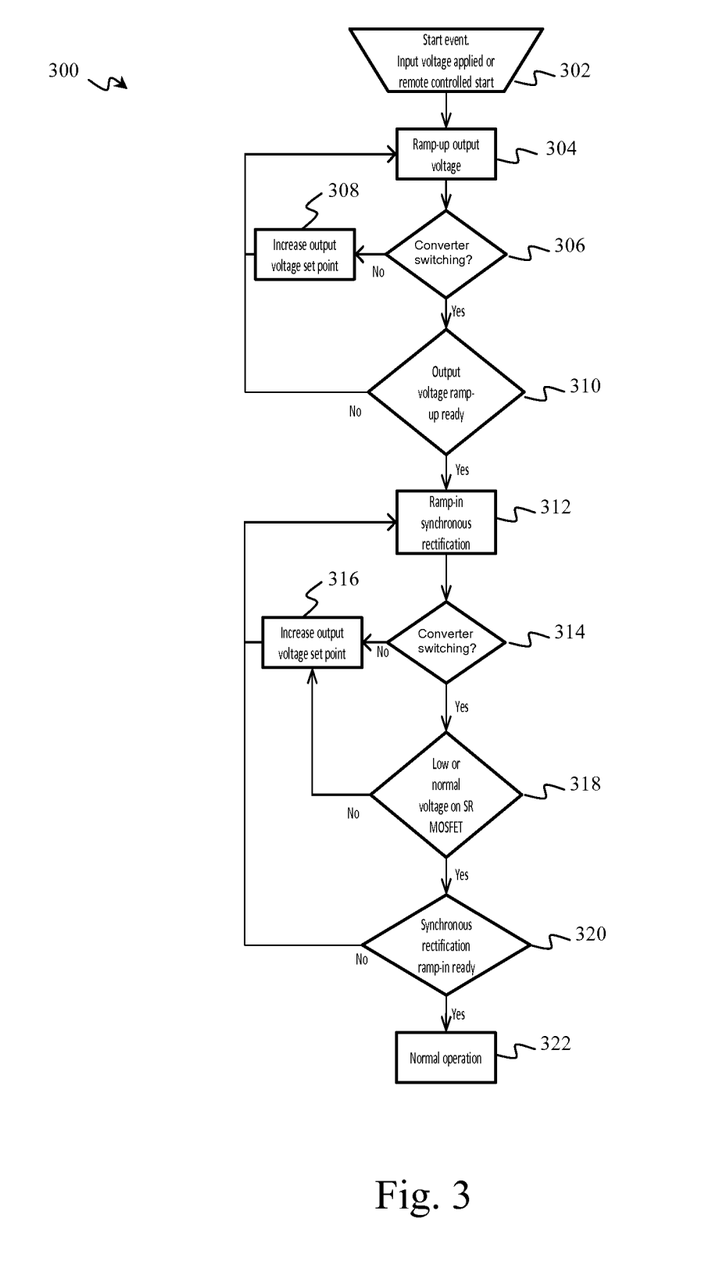
FIG. 3 is a flow chart diagram showing a sequence of steps carried out in a method performed by a DC-DC power converter in the droop load share SMPS of FIG. 1 to facilitate synchronous start-up.

FIG. 3 is a flowchart diagram showing a sequence of steps carried out in a method 300 performed by each of the power converters 102 in the droop load share SMPS of FIG. 1 to facilitate synchronous start-up of the power converters 102. At a first stage 302 of the method 300, an input voltage is applied to the inverting switch 104 of the power converter 102. In one embodiment the input voltage is applied using a start signal from a controller, such as controller 114 or a more remote controller. Then, at stage 304, the synchronous rectifier 108 operates in diode mode and begins ramping up the output voltage of the converter 102. The controller 114 may control the synchronous rectifier 108 to operate in diode mode during this stage. At stage 306, the control circuitry 110 detects if the converter 102 is switching, in particular whether the inverting switch 104 is switching. If the inverting switch 104 has stopped switching the control circuitry 110 causes the voltage reference set point 203 to increase at stage 308 and the ramp-up of the output voltage is continued at stage 304. When the converter 102 has started switching again, the control circuitry 110 ceases to increase the voltage reference set point 203 and the output voltage of the converter 102 is checked at stage 310 to determine whether the synchronous rectifier 108 should change from the diode mode to the ramp-in mode. The decision and command to change modes may be made by the controller 114. If the output voltage of the converter is sufficiently high, the ramp-in mode is started at stage 312, otherwise, the synchronous rectifier 108 continues to ramp up the voltage in diode mode at stage 304 and to check if the converter 102 is switching at stage 306.

After the synchronous rectifier 108 has entered the ramp-in mode at stage 312, the control circuitry 110 operates at stage 314 to check if the converter 102 is switching. If the inverting switch 104 has stopped switching the control circuitry 110 causes the voltage reference set point 203 to increase at stage 316 and the ramp-in mode is continued at stage 312. Moreover, the control circuitry 110 operates at stage 318 to check if the voltage on the output of the synchronous rectifier 108 is low or normal. If the synchronous rectifier output voltage is high the control circuitry 110 causes the voltage reference set point 203 to increase at stage 316 and the ramp-up of the output voltage is continued at stage 312. When the synchronous rectifier output voltage has returned to (or has remained at) a low or normal level, the controller 114 determines at stage 320 whether the ramp-in mode has been completed and, if so, the converter 102 is caused to enter normal operation (stage 322), otherwise the ramp-in mode is continued at stage 312.

It should also be noted that in some alternate implementations of the method 300, the functions/acts noted in the blocks may occur out of the order noted in the flowchart. For example, two blocks shown in succession may in fact be executed substantially concurrently or the blocks may sometimes be executed in the reverse order, depending upon the functionality/acts involved. Moreover, the functionality of a given block of the flowchart in FIG. 3 may be separated into multiple blocks and/or the functionality of two or more blocks of the flowcharts may be at least partially integrated. Finally, other blocks may be added/inserted between the blocks that are illustrated.

Figure 4:
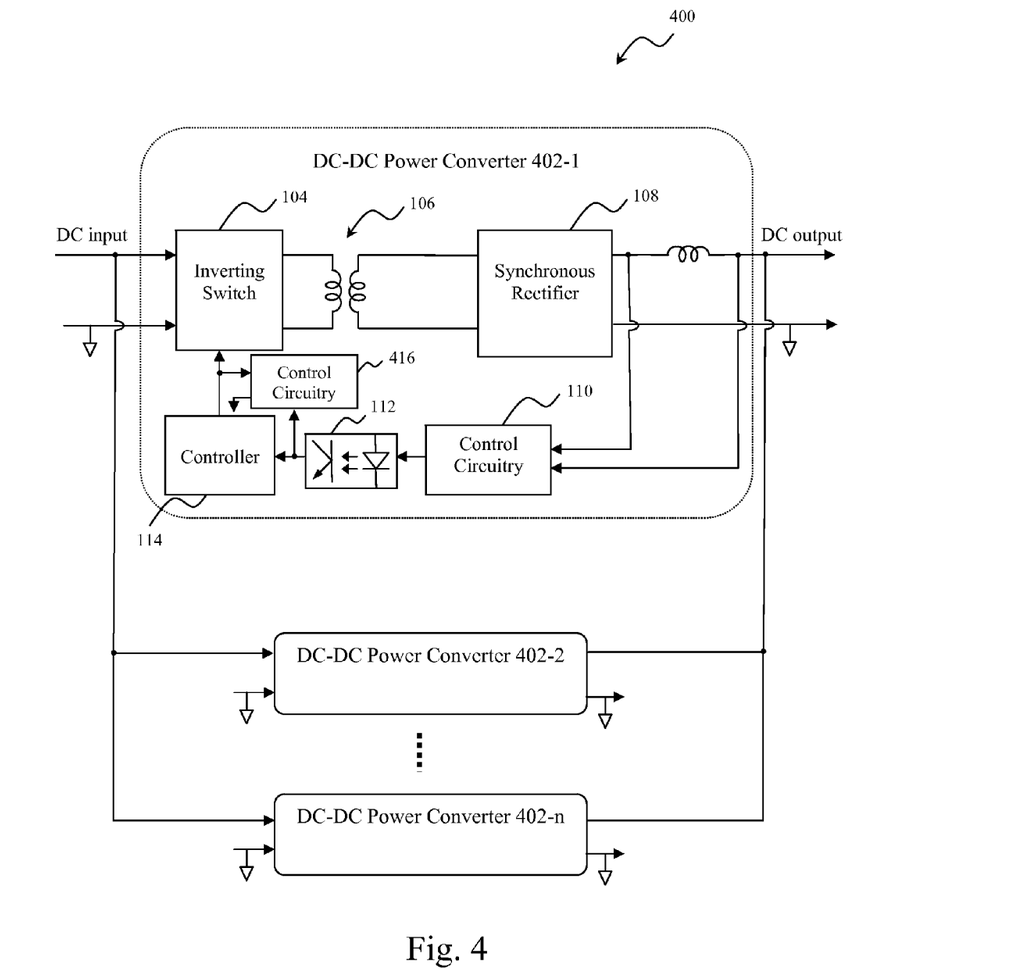
FIG. 4 is a block diagram of an alternate embodiment of a droop load share SMPS with a plurality of DC-DC power converters arranged in parallel with control circuitry for synchronous start-up.

In one alternative embodiment of the converters 102, the detection of whether the inverter 104 has stopped switching may be carried out by control circuitry on the primary side of the transformer 106. FIG. 4 depicts one such alternative embodiment of the droop load share SMPS 400 with converters 402 having an additional or second set of control circuitry 416 on the primary side of the transformer 106, but otherwise structured the same as the converters 102 of the droop load share SMPS 100 FIG. 1. The second control circuitry 416 detects that the inverting switch 104 has stopped switching by reading duty cycle control signals communicated from the controller 114 to the inverting switch 104. The second control circuitry 416 also reads the output of the error amplifier 202 to ensure that inverting switch 104 has stopped switching due to a low error amplifier output and not due to some other reason. If the low duty cycle control signals are detected and the error amplifier output is low (e.g., below a threshold level), the second control circuitry 416 commands the controller 114 to increase the duty cycle to cause the inverting switch 104 to start switching again. In this embodiment the high voltage on the synchronous rectifier output need not be detected to determine whether the inverting switch 104 has stopped switching because the second control circuitry 416 has a more direct and accurate way of making that determination. However, the control circuitry 110 may still be included to detect and act against high voltages on the synchronous rectifier output because the high voltage and its attendant reverse current risks may occur for other reasons unrelated to non-synchronous start-up.

In addition to facilitating synchronous start-up of paralleled converters in a droop load share SMPS, embodiments of the present invention prevent or limit reverse currents in the converters 102, particularly in converters with relatively slower start-up times. These objectives are achieved at least in part by detecting a stopped switching condition of each converter and/or a high voltage condition of a synchronous rectifier output in each converter and increasing a reference voltage set point if either condition is detected, thereby forcing the converter to not stop, but rather, to continue its start-up cycle and thereby increase the output power of the transformer 106.

Moreover, in some applications the droop load share SMPS 100, 400 may operate with only a portion of the converters 102, 402 activated, e.g., if a load is comparably light. Subsequently, when the load increases, one or more spare converters 102, 402 of the droop load share SMPS 100, 400 may be activated. During start-up of the one or more spare converters 102, 402, reverse currents could flow into the relatively low voltage output terminals of the one or more spare converters 102 from the already activated converters. However, the control circuitry 110 of each of the one or more spare converters 102, 402 is configured to detect a high voltage on the output of the synchronous rectifier 108 and to increase the reference voltage set point to ensure limited or no reverse currents. In fact, the control circuitry 110 facilitates operating the synchronous rectifier 108 in diode mode during the entire start-up cycle of a spare converter to prevent any reverse current from damaging the synchronous rectifier 108.

Many different embodiments have been disclosed herein, in connection with the above description and the drawings. Although unduly repetitious and obfuscating descriptions of every combination and subcombination of these embodiments have been omitted, the present specification, including the drawings, shall be construed to constitute a complete written description of various example combinations and subcombinations of embodiments and of the manner and process of making and using them, and shall support claims to any such combination or subcombination.

Moreover, the functionality of a given block of the block diagrams in FIGS. 1, 2, and 4 may be separated into multiple blocks and/or the functionality of two or more blocks of the block diagrams may be at least partially integrated. Finally, other blocks may be added/inserted between the blocks that are illustrated. Moreover, although some of the diagrams include arrows on communication paths to show a primary direction of communication, it is to be understood that communication may occur in the opposite direction to the depicted arrows.

Many variations and modifications can be made to the embodiments without substantially departing from the principles of the present invention. All such variations and modifications are intended to be included herein within the scope of the present invention.

What is claimed is:

1. A method for controlling a DC-DC power converter, the DC-DC power converter including an inverting switch that converts input DC power to intermediate AC power, a transformer coupled to the inverting switch to receive the intermediate AC power and provide stepped-down AC power, and a synchronous rectifier coupled to the transformer to convert the stepped-down AC power to output DC power, the DC-DC power converter being arranged in parallel with at least one other DC-DC power converter in a droop load share switched-mode power supply, the method comprising:
    detecting that the inverting switch is not switching during start-up of the DC-DC power converter; and
    increasing a reference voltage set point of the DC-DC power converter in response to detecting that the inverting switch is not switching to force the inverting switch to start switching.

2. The method of claim 1, wherein detecting that the inverting switch is not switching during start-up of the DC-DC power converter includes detecting that the inverting switch is not switching during at least one of a diode mode and a ramp-in mode of the synchronous rectifier.

3. The method of claim 1, wherein the inverting switch provides the intermediate AC power to a primary side of the transformer and wherein detecting that the inverting switch is not switching includes measuring an output of the secondary side of the transformer.

4. The method of claim 1, the method further comprising:
    detecting that a voltage level at an output of the synchronous rectifier is higher than a threshold; and
    increasing the reference voltage set point of the power converter in response to detecting that the voltage level at the output of the synchronous rectifier is higher than the threshold to force the DC-DC power converter to increase the stepped-down AC power provided by the transformer.

5. The method of claim 4, wherein the reference voltage set point of the power converter is increased no higher than a highest voltage level expected to be output by any of the other power converters.

6. A droop load share switched-mode power supply comprising:
    a first DC-DC power converter including:

an inverting switch configured to convert input DC power to intermediate AC power;
a transformer coupled to the inverting switch to receive the intermediate AC power and provide stepped-down AC power;
a synchronous rectifier coupled to the transformer to convert the stepped-down AC power to output DC power; and
control circuitry configured to control the power converter,
a second DC-DC power converter arranged in parallel with the first DC-DC power converter,
wherein the control circuitry of the first DC-DC power converter includes circuitry configured to:
detect that the inverting switch is not switching during start-up of the first DC-DC power converter; and
increase a reference voltage set point of the first DC-DC power converter in response to detecting that the inverting switch is not switching to force the inverting switch to start switching.

7. The droop load share switched-mode power supply of claim 6, wherein the circuitry configured to detect that the inverting switch is not switching during start-up of the DC-DC power converter is configured to detect that the inverting switch is not switching during a diode mode and a ramp-in mode of the synchronous rectifier.

8. The droop load share switched-mode power supply of claim 6, wherein the inverting switch is configured to provide the intermediate AC power to a primary side of the transformer and wherein the circuitry configured to detect that the inverting switch is not switching includes circuitry configured to measure an output of the secondary side of the transformer.

9. The droop load share switched-mode power supply of claim 6, the control circuitry of the first DC-DC power converter further including circuitry configured to:
detect that a voltage level at an output of the synchronous rectifier is higher than a threshold; and
increase the reference voltage set point of the power converter in response to detecting that the voltage level at the output of the synchronous rectifier is higher than the threshold to force the DC-DC power converter to increase the stepped-down AC power provided by the transformer.

10. The droop load share switched-mode power supply of claim 9, wherein the reference voltage set point of the power converter is increased no higher than a highest voltage level expected to be output by any of the other power converters.

11. A DC-DC power converter configured for operation in parallel with at least one other DC-DC power converter in a droop load share switched-mode power supply, the DC-DC power converter comprising:
an inverting switch configured to convert input DC power to intermediate AC power;
a transformer coupled to the inverting switch to receive the intermediate AC power and provide stepped-down AC power;
a synchronous rectifier coupled to the transformer to convert the stepped-down AC power to output DC power; and
control circuitry configured to control the power converter, the control circuitry including circuitry configured to:
detect that the inverting switch is not switching during start-up of the DC-DC power converter; and
increase a reference voltage set point of the DC-DC power converter in response to detecting that the inverting switch is not switching to force the inverting switch to start switching.

12. The DC-DC power converter of claim 11, wherein the circuitry configured to detect that the inverting switch is not switching during start-up of the DC-DC power converter is configured to detect that the inverting switch is not switching during a diode mode and a ramp-in mode of the synchronous rectifier.

13. The DC-DC power converter of claim 11, wherein the inverting switch is configured to provide the intermediate AC power to a primary side of the transformer and wherein the circuitry configured to detect that the inverting switch is not switching includes circuitry configured to measure an output of the secondary side of the transformer.

14. The DC-DC power converter of claim 11, the control circuitry of the first DC-DC power converter further including circuitry configured to:
detect that a voltage level at an output of the synchronous rectifier is higher than a threshold; and
increase the reference voltage set point of the power converter in response to detecting that the voltage level at the output of the synchronous rectifier is higher than the threshold to force the DC-DC power converter to increase the stepped-down AC power provided by the transformer.

15. The DC-DC power converter of claim 14, wherein the reference voltage set point of the power converter is increased no higher than a highest voltage level expected to be output by any of the other power converters.

* * * * *